United States Patent [19]

Langlois et al.

[11] Patent Number: 4,959,001
[45] Date of Patent: Sep. 25, 1990

[54] BLOW MOLDING MACHINE WITH ACCUMULATOR WAITING TIME CONTROL

[75] Inventors: Jacques A. E. Langlois, Vellmar; Heinrich M. G. Bergmann; Wolfgang Nuhn, both of Kassel, all of Fed. Rep. of Germany

[73] Assignee: U.S. Philips Corporation, New York, N.Y.

[21] Appl. No.: 326,581

[22] Filed: Mar. 21, 1989

[30] Foreign Application Priority Data

Mar. 24, 1988 [DE] Fed. Rep. of Germany ....... 3809856

[51] Int. Cl.$^5$ ............................................. B29C 49/04
[52] U.S. Cl. ..................... 425/147; 264/541; 264/40.7; 425/140; 425/145; 425/150; 425/161; 425/166; 425/532; 425/381
[58] Field of Search ................ 425/140, 145, 147, 148, 425/150, 159, 161, 166, 163, 532, 557, 558, 380, 381; 264/40.4, 40.7, 540, 541

[56] References Cited

U.S. PATENT DOCUMENTS 3,865,528  2/1975  Roess ................................... 425/145
4,338,071  7/1982  Daubenbuchel et al. ............ 425/145
4,678,420  7/1987  Inoue ................................... 425/145

FOREIGN PATENT DOCUMENTS 3416781  11/1985  Fed. Rep. of Germany ...... 264/541

*Primary Examiner*—James C. Housel
*Attorney, Agent, or Firm*—Jack D. Slobod

[57] ABSTRACT

A blow molding machine for the blow molding of hollow articles includes an accumulator head (1) for producing a preform and a blow mold for forming a hollow article from the preform. After completion of a blow molding sequence and the filling of the accumulator head (1), a piston positioning signal is sent by a control system (15) to regulate the position of a discharge piston (4) in the accumulator head (1) derived from a comparative signal of the actual position and set position of the discharge piston (4). The set position is determined by integration from a previously specified speed set point profile. The control system (15) further superimposes an influx signal on the comparative signal, which corresponds to the change in volume of plastic flowing from an extruder (2) to replace the discharged contents of the accumulator head (1). The control system (15) uses the influx signal value determined at the end of a discharge stroke for correcting the set point values for the initial position and the final position for the next discharge stroke. The waiting time between completion of the blow molding sequence and reaching the set point contents level and vice versa is reduced by the control system (15) by controlling the rotational speed of the extruder (2).

10 Claims, 1 Drawing Sheet

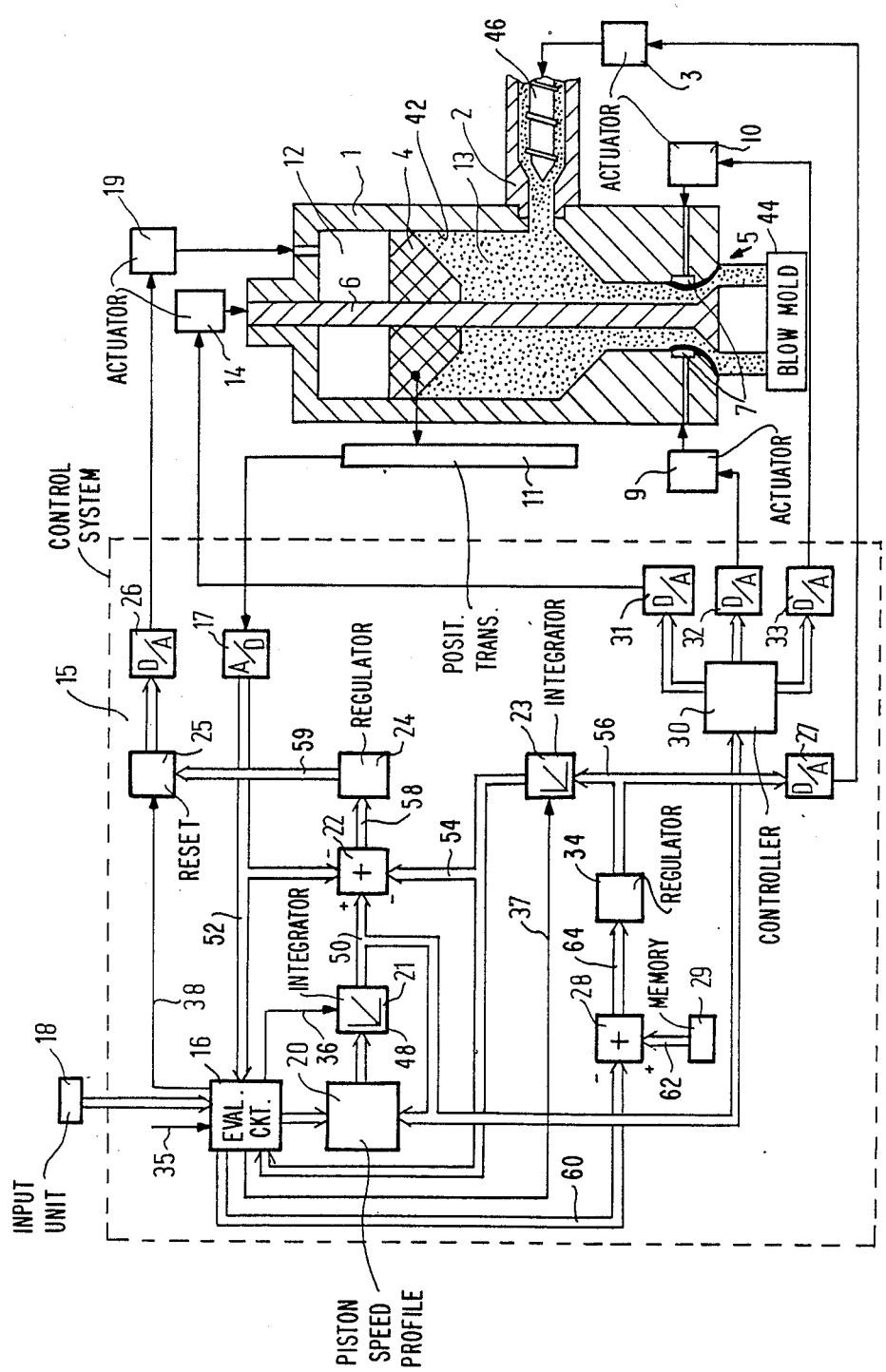

BLOW MOLDING MACHINE WITH ACCUMULATOR WAITING TIME CONTROL

BACKGROUND OF THE INVENTION

The invention relates to a blow molding machine for the blow molding of hollow articles, with an accumulator head, which is connected to an extruder supplying plastic, and from which in the filled condition a discharge piston drives the plastic through an annular slit-shaped discharge opening to produce a preform, with a blow mold for forming a hollow article from the preform and with a control system, which after completion of a blow molding sequence and the filling of the accumulator head, derives a piston positioning signal for regulating the position of the discharge piston from a comparative signal, which is formed from the difference between the actual position and the set position of the discharge piston, the set position being determined by integration from a previously specified speed set point profile.

2. Description of the Prior Art

In order to blow mold hollow articles from thermoplastic synthetic material, tubular shaped preforms are produced from the relevant synthetic material using an accumulator head and in a further operation are inflated between two hollow mold halves (blow mold) to the final size. The accumulator head is connected to an extruder, from which the thermoplastic synthetic material reaches the accumulator head. The accumulator head has an annular slit-shaped discharge opening, which is adjustable. The thermoplastic synthetic material is driven out of the discharge opening by a discharge piston. The preform which results in this way is stretched nonuniformly depending on the shape of the hollow article to be obtained. Thus, a uniform wall thickness of the hollow article requires a profiling of the wall thickness in the preform (wall thickness set point profile). This wall thickness set point profile of the preform is produced by adjusting the slit width of the discharge opening during the discharge step and adjusting the speed of the discharge piston. A blow molding machine working in this manner is known from German Offenlegungsschrift 3,416,781.

During a discharge step the speed of the discharge piston is determined by regulating the position of the discharge piston. A piston actuator displaces the discharge piston depending on the piston positioning signal of a position regulator. The position regulator receives a comparative signal, which is formed in a superimposition stage by subtraction of the actual position from the set position. Here, the set position is determined by integration from a previously specified speed set point profile. The speed set point profile is divided into a certain number of segments, which define various positions. A variation in the speed may occur from one segment to the next. This speed curve which has been preselected by the profile corresponds to the profile for the wall thickness control at the discharge opening.

The speed set point profile is determined for a certain volume within the accumulator head. If the volume of synthetic material within the accumulator head remains constant in successive discharge steps, a preform is produced (reference preform) which essentially exhibits the same features, namely constant length and constant volume. Here, it is necessary that the influx of synthetic material from the extruder remains constant. If this influx of synthetic material varies, e.g. by variation of the rotational speed of the extruder, the discharged tube also varies.

The discharge step can only begin when the accumulator head is filled with thermoplastic synthetic material (until the set point contents level is reached) and the blow molding sequence for producing a hollow article is complete. If the blow molding sequence is not yet finished, the accumulator head continues to be filled with synthetic material, until after the conclusion of the blow molding sequence the discharge step can begin. The additional influx of synthetic material caused by the overfilling of the accumulator head causes variations in the preform. Profiling of the preform is only undertaken when the additional synthetic material has been discharged as a so-called "run-in tube". A waiting time also arises when the blow molding sequence is complete, but the accumulator head is not yet completely filled to its set point contents level. A loss of material and a reduction in the number of hollow articles which can be produced per unit time (reduction in capacity) results from the waiting time between completion of the blow molding sequence and reaching the set point contents level in the accumulator head and vice versa.

SUMMARY OF THE INVENTION

The object of the invention is therefore to provide a blow molding machine for the blow molding of hollow articles, in which a loss of material is reduced and the number of hollow articles which can be produced per unit time is increased, the preform resulting from the discharge step substantially corresponding to a reference preform.

This object is achieved with a blow molding machine of the type initially mentioned, in that the control system
  superimposes an influx signal on the comparative signal, which corresponds to the change in volume of synthetic material flowing from the extruder to replace the discharged contents of the accumulator head,
  uses the influx signal value determined at the end of a discharge step for correcting set point values for an initial position and a final position for the next discharge step and
  reduces the waiting time between completion of the blow molding sequence and reaching the set point contents level and vice versa by controlling the rotational speed of the extruder.

With the blow molding machine according to the invention a preform is produced which substantially corresponds to the reference preform even when the influx from the extruder varies. The speed set point profile is determined for a constant volume in the accumulator head. This requires that a constant influx of thermoplastic synthetic material comes out of the extruder. A constant set point contents level, at which the discharge step begins, and a set point cushion with which the discharge ends have been determined for this speed set point profile. The variation of the influx of synthetic material from the extruder is compensated by an influx signal, which is superimposed on the comparative signal. The influx signal is previously specified for the reference preform. It corresponds to the quantity of thermoplastic synthetic material which flows into the accumulator head during the formation of a reference preform. This influx signal affects the set position of the discharge piston in such a way that the synthetic material which has flowed from the extruder in a greater or lesser amount during the discharge step cannot alter the volume of the preform. Only that synthetic material is discharged which corresponds to the volume of the reference preform. At the end of the discharge step the discharge piston does not reach the set point cushion without a correction of the set point values for the initial position and the final position. The set point values for the initial position and the final position correspond to the set point contents level and the set point cushion in the case of the reference preform. Thus the value of the influx signal at the end of a discharge step is used for correcting the set point values for the initial position and the final position for the next discharge step. By these measures it is ensured that the preform corresponds substantially to the reference preform and the set point cushion is maintained. The remaining synthetic material in the accumulator head (cushion) stays constant and also the residence time of the synthetic material. This enables reproducible preforms to be produced.

The reduction in the waiting time between completion of the blow molding sequence and reaching the set point contents level and vice versa is achieved by controlling the rotational speed of the extruder. In this way a greater or lesser amount of thermoplastic synthetic material is transferred to the accumulator head. An increase in the rotational speed is necessary if the blow molding sequence is complete, but the set point contents level in the accumulator head has not yet been reached. A reduction in the rotational speed of the extruder is required in the opposite case, when the set point contents level has been reached, but the blow molding sequence is not yet finished.

In a first embodiment of the invention provision is made so that the control system
 measures the actual waiting time,
 forms a differential signal between a set waiting time of zero and an actual waiting time and
 generates a rotational speed set point signal for an extruder actuator for setting the rotational speed by integration from the differential signal.

In this way, the situation can be reached in which the waiting time is equal to zero. The waiting time is defined in such a way that it is positive when the set point contents level has been reached, but the blow molding sequence is not yet complete. The waiting time is negative in the opposite case. The control system receives a measuring signal for the position of the discharge piston from a position transducer; the end of the blow molding sequence is reported to the control system by the blow molding control system.

The influx signal is formed in the control system from the rotational speed set point signal by integration. As the volume is proportional to the integrated flow of synthetic material per unit time, while the flow is proportional to the rotational speed and the rotational speed in turn is proportional to the rotational speed set point signal, the influx signal results by integration from the rotational speed set point signal. With each new discharge step the integrator must be set to zero, since the added quantity of synthetic material at the beginning of the discharge step is equal to zero.

The initial and final points of the speed set point profile are determined from the previously specified set point value for the initial position and the previously specified set point value for the final position of the discharge piston. If the discharge piston reaches the set point value for the initial position and if the blow molding sequence is complete, the speed set point profile is output; it ends when the set point value for the final position has been reached. In order to correct the travel of the discharge piston which has been shortened by the influx signal the control system subtracts the influx signal value measured at the end of a discharge step from a previously specified set point contents level and from a previously specified set point cushion, the calculated values representing the set point values for the initial position and the final position for the next discharge step.

The discharge piston is regulated between the beginning of the discharge step and reaching the set point value for the final position. Here, a piston actuator is provided which positions the discharge piston depending on the piston positioning signal in order to regulate the discharge piston. After the set point value for the final position has been reached the piston actuator, by means of a reset signal from the control system, brings about a return of the discharge piston to its initial position by filling the accumulator head from the extruder.

The control system may be produced as a digital calculating device (microcomputer) or by means of discrete components. For the generation of the rotational speed set point signal by means of discrete components the control system contains an integral regulator which generates the rotational speed set point signal for the extruder actuator from the differential signal formed in a comparative stage. Moreover, the control system contains a first integrator for forming the influx signal from the rotational speed set point signal for the extruder actuator.

The control system further contains an evaluation circuit, which
 determines the set point values for the initial position and the final position,
 causes the discharge piston to begin moving and
 measures the waiting time.

A further circuit controlled by the evaluation circuit supplies the speed set point profile. A second integrator connected downstream integrates the speed set point values, which are fed to a superimposition stage, in which the difference between the actual position and the set position and the superimposition of the comparative signal and the influx signal is formed. The piston positioning signal supplied by the control system is generated by a position regulator, which receives the signal formed by the superimposition stage.

BRIEF DESCRIPTION OF THE DRAWING

The sole FIGURE of the drawing is a schematic representation of the blow molding machine of the present invention including an accumulator head position shown in cross-section.

DETAILED DESCRIPTION OF THE PREFERRED EMBODIMENTS

The blow molding machine shown schematically in the sole FIGURE contains an accumulator head 1, which produces preforms made from thermoplastic synthetic material 13 and discharges them to a blow mold 44 shown schematically as a box. Blow mold 44 has the function of pressing the preforms to form hollow articles. The thermoplastic synthetic material 13 is supplied to a chamber 42 of accumulator head 1 from an extruder 2, which is controlled by an extruder actuator 3. The extruder actuator 3 adjusts the rotational speed of the extruder and thereby determines the flow of the thermoplastic synthetic material 13 flowing into the accumulator head chamber 42. The thermoplastic synthetic material 13 which has entered the cylindrical accumulator head 1 from the extruder 2, as soon as it has been accumulated in a sufficient quantity, is driven out through an annular slit-shaped discharge opening 5 by a discharge piston 4. The slit width is continually adjusted by a mandrel 6. The wall thickness of a preform can further be partially adjusted by means of an adjustable die ring 7 by several actuators (partial wall thickness adjustment). In the drawing, as an example the die ring 7 is adjusted by two wall thickness actuators 9 and 10. The mandrel 6 is adjusted by a mandrel actuator 14.

The position of the discharge piston 4, which is actuated by a piston actuator 19 (hydraulic actuator), is measured by means of a position transmitter 11. The discharge under pressure of the thermoplastic synthetic material 13 through the annular slit-shaped discharge opening 5 by means of the discharge piston 4 is accomplished by filling the hollow chamber 12 of the accumulator head 1 behind piston 4, which is not filled with thermoplastic synthetic material 13, with hydraulic oil. When the discharge step is finished, the hydraulic oil flows out of the hollow chamber 12 again, and the discharge piston 4 is raised to its initial position by the thermoplastic synthetic material 13 supplied from the extruder 2.

The accumulator head 1 is regulated and controlled by a control system 15, which is constructed from discrete digital components. The control system 15 contains an evaluation circuit 16, to which the actual position of the discharge piston 4 determined by the position transducer 11 is supplied via an analog-digital convertor 17. The set point contents level and the set point cushion are fed to the evaluation circuit 16 via an input unit 18. The discharge step can only begin when the set point contents level has been reached and ends precisely when the set point cushion has been reached. The set point cushion represents the residual synthetic material 13 remaining in the accumulator head 1 at the end of a discharge step. The evaluation circuit 16 receives a further status signal from a blow mold control system via a line 35, which indicates whether the blow mold is ready to receive a new preform. The evaluation circuit 16 further receives an influx signal value at the end of a discharge step.

If the evaluation circuit 16 establishes that the blow mold is ready to accept a new preform and the set point contents level has been reached, a starting signal is supplied to a circuit 20, whereupon this generates a speed set point profile. The circuit 20 receives the set point values for the initial position and the final position from the evaluation circuit 16 before the beginning of the discharge step. The speed set point profile represents the speed of the discharge piston depending on the position of the discharge piston 4 between the set point contents level and the set point cushion for a reference preform. The set point value for the initial position of the reference preform corresponds to the set point contents level and the set point value for the final position corresponds to the set point cushion. The speed set point profile is divided into individual segments, which define various positions. The speed varies linearly from segment to segment. The speed set point values output on line 48 are integrated in an integrator 21 and are fed on line 50 to a superimposition or addition/subtraction stage 22 as a set position. The set position supplied by the integrator 21 on line 50 is fed back to the circuit 20 and serves to alter the speed set point profile depending on the set position. If the circuit 20 establishes that the set point value of the final position has been reached, the output of the speed set point profile is terminated. The integrator 21 is set to the actual position by the evaluation circuit 16 via the line 36 before the beginning of a discharge step.

Moreover, the superimposition stage 22 receives the actual piston position from the analog-digital converter 17 via line 52 and an influx signal via line 54 from a further integrator 23. The influx signal is formed for the extruder actuator 3 by integration of the rotational speed set point signal on line 56 in the integrator 23. The influx signal and the actual position are subtracted from the set position in the superimposition stage 22. The error signal resulting from the subtraction is supplied on line 58 to a position regulator 24 which generates a piston positioning signal on line 59, which is supplied to the piston actuator 19 via a reset circuit 25 and a digital-to-analog converter 26. A signal is fed from the evaluation circuit 16 via a line 38 to the reset circuit 25, which has the effect that at the beginning of the discharge step the piston positioning signal is fed to the piston actuator 19.

At the end of the discharge step the piston actuator 19 is controlled in such a way that the discharge piston 4 returns to its initial position by the chamber 42 of accumulator head 1 being filled with thermoplastic synthetic material.

A certain volume within the accumulator head 1 and a certain influx of synthetic material from the extruder 2 during the discharge step have been determined for the reference preform. Since during the discharge step the synthetic material supplied from the extruder 2 can vary, the set position must then be compensated in order to produce a preform which corresponds to the reference preform. The volume of synthetic material, which flows into the accumulator head 1 to a greater or lesser extent during the discharge step, is proportional to the integrated influx per unit time of the synthetic material. This flow is in turn proportional to the rotational speed and the rotational speed is proportional to the rotational speed set point signal. By integration of the rotational speed set point signal in the integrator 23 an influx signal on line 54 is thus produced, which corresponds to the volume flowing in during the discharge step. The integrator 23 is set to zero before the beginning of a discharge step by a resetting signal from the evaluation circuit 16 via the line 37.

At the end of the discharge step the discharge piston 4 no longer reaches the set point cushion, since it is additionally raised by the volume of the synthetic material supplied during the discharge step from the extruder 2. In order to enable the discharge piston to reach the set point cushion, the influx signal value at the end of a discharge step is fed to the evaluation circuit 16, which serves to correct the set point values for the initial position and the final position. In the evaluation circuit 16 the set point contents level and the set point cushion are reduced by the influx signal value. These newly calculated values serve as the set point values for the initial position and the final position and are fed to the circuit 20.

A new discharge step can only begin under the condition that the blow mold is ready to receive a new preform and that the discharge piston 4 has reached set point contents level. If the blow molding sequence is not yet finished, but the accumulator head 1 is already adequately filled, the discharge step begins when the blow molding sequence has finished. The additional synthetic material which arises in this case is driven out as the so-called "run-in tube" before the beginning of the formation of the preform. A loss of synthetic material arises from this. The speed set point profile can only be valid once the set point value for the initial position has been reached. The evaluation circuit 16 brings about the start of the discharge step. The circuit 20 outputs a constant speed set point value before the set point value for the initial position has been reached (first profile value for the run-in tube). When the set point value for the initial position has been reached the circuit 20 switches over to the speed set point profile and begins to output set point values.

It is on the other hand also possible, that the blow molding sequence finishes and the set point contents level in the accumulator head 1 has not yet been reached. In order to bring the waiting time between completion of the blow molding sequence and reaching the set point contents level in the accumulator head 1 and vice versa to zero, an integral regulator 34 is provided which generates the rotational speed set point signal which is fed to the integrator 23 and to the extruder actuator 3 via a digital-to-analog converter 27. The integral regulator 34 receives a differential signal via line 64 from a comparison stage 28, which carries out a comparison between a signal on line 62 for achieving the set waiting time and a signal on line 60 for achieving the actual waiting time. A signal corresponding to a set waiting time of zero is supplied by a memory element 29. The actual waiting time is determined in the evaluation circuit 16 by measuring the time between conclusion of the blow molding sequence and reaching the set point contents level and vice versa. If the set point contents level is reached before the blow molding sequence is finished, the actual waiting time is positive. If the blow molding sequence is finished before the set point contents level has been reached, the actual waiting time is negative. The actual waiting time is reduced to zero by this integral regulator 34. Investigations have shown that this closed loop control system for waiting time control is stable.

The wall thickness actuators 9 and 10 and the mandrel actuator 14 are controlled by a circuit 30, which supplies the individual set point values (wall thickness set point profiles) for the mandrel positioning and the wall thicknesses via digital-to-analog converters 31, 32 and 33 depending on the set position.

We claim:

1. A blow molding machine for the blow molding of articles, comprising:
   an accumulator head, which is connected to an extruder having a controllable rotational speed for supplying a flow of synthetic material for filling the accumulator head, and from which in a filled condition a discharge piston discharges the synthetic material in a discharge stroke through an annular slit-shaped discharge opening to produce a preform having a wall thickness;
   a blow mold means for receiving the preform and forming a blown article from the preform in a blow molding sequence; and
   a control means which after completion of a last prior blow molding sequence and the filling of the accumulator head, derives a piston positioning signal for regulating the position of the discharge piston in a next discharge stroke, said control means comprising:
   actual position measuring means for measuring the actual position of the discharge piston;
   means responsive to the actual position measuring means for forming a comparative signal from the difference between the actual position and a set position of the discharge piston, the set position being determined by set point values for an initial piston position and a final piston position, respectively corresponding to a set point accumulator head contents level and a set point accumulator head cushion for said synthetic material, and by integration from a previously specified discharge piston speed set point profile provided for a desired wall thickness profile of the preform
   means for forming an influx signal which corresponds to the change in volume of synthetic material flowing from the extruder (2) to replace the discharged contents of the accumulator head (1) and for superimposing said influx signal on said comparative signal;
   means for using an influx signal value determined at the end of a last prior discharge stroke for correcting the set point values for the initial piston position and the final piston position for the next discharge stroke; and
   means for controlling the rotational speed of the extruder (2) in a manner for producing a predetermined waiting time between completion of the last prior blow molding sequence and reaching a set point contents level at said accumulator head.

2. The blow molding machine according to claim 1, wherein the means for controlling the rotational speed comprises:
   means for measuring an actual waiting time;
   means for forming a differential signal between a set waiting time of zero and the actual waiting time; and
   means for generating a rotational speed set point signal for said extruder by integration of the differential signal.

3. The blow molding machine according to claim 2, wherein said means for forming the influx signal forms the influx signal from the rotational speed set point signal by integration.

4. The blow molding machine according to claim 3, wherein said means for using the influx signal value subtracts the influx signal value measured at the end of the last prior discharge stroke from the set point contents level and from the set point cushion for the last prior discharge stroke to determine the corresponding set point values for the initial piston position and the final piston position for the next discharge stroke.

5. The blow molding machine according to claim 4, further comprising a piston actuator (19) which positions the discharge piston (4) depending on the piston positioning signal in order to regulate the position of the discharge piston, and wherein the control means (15) further comprises means for generating a reset signal after the set point value for the final position has been reached, by filling the accumulator head (1) from the extruder (2), for feeding the piston actuator in a manner to position the discharge piston to the initial position for the next discharge stroke.

6. The blow molding machine according to claim 1, wherein, the control means (15) includes an integral regulator (34) which generates a rotational speed set point signal for the extruder from a differential signal formed as the difference between signals indicative of actual and set waiting times.

7. The blow molding machine according to claim 6, wherein said means for forming said influx signal value comprises: a first integrator (23) fed by the rotational speed set point signal.

8. The blow molding machine according to claim 7, wherein the control means (15) further includes an evaluation circuit (16), which comprises means:
for determining the set point values for the initial position and the final position,
for initiating the next discharge stroke, and
for measuring the waiting time, and wherein said control means further includes:
a circuit (20) controlled by the evaluation circuit for supplying the discharge piston speed set point profile; a second integrator (21) for said integration from the discharge piston speed set point profile; a superimposition stage (22), which forms the difference between the actual position and the set position as the comparative signal and which forms as an output signal the superimposition of the comparative signal and the influx signal; and a position regulator (24), which generates the piston positioning signal from the output signal formed by the superimposition stage.

9. A blow molding apparatus comprising:
a blow mold means for receiving a preform of synthetic material and in a blow molding sequence, forming a hollow blown article from the preform;
an accumulator head having an elongated chamber for said material and an annular slit-shaped discharge opening at one end of the chamber, communicating with the blow mold means;
an extruder communicating with said chamber for influx of said material thereto, said extruder having a speed which determines the rate of said influx to said chamber;
a discharge piston controllably positionable longitudinally in said chamber for selectively and controllably discharging said synthetic material from said chamber through said discharge opening in the form of a preform during a discharge stroke of said piston;
and a control means responsive to the completion of a blow molding sequence for deriving signals for positioning said piston while controlling the speed of said extruder in a manner for reducing the waiting time between the completion of the blow molding sequence and the reaching of a set point contents level in said chamber, said control means including:
means responsive to a measure of the speed of the extruder for forming an influx signal corresponding to the volume of synthetic material flowing from the extruder into said chamber;
means responsive to the influx signal value at the end of said discharge stroke for determining set point values for an initial and a final position of said piston for a next discharge stroke; and
means responsive to said influx signal and said initial and final piston position set point values for deriving a signal for positioning said piston.

10. The blow molding apparatus according to claim 9, further comprising means for generating a speed profile signal indicative of a predetermined discharge piston set point speed profile and means for integrating said speed profile signal, and wherein said means for deriving a signal for positioning said piston is also responsive to said integrating means.

* * * * *